UNITED STATES PATENT OFFICE.

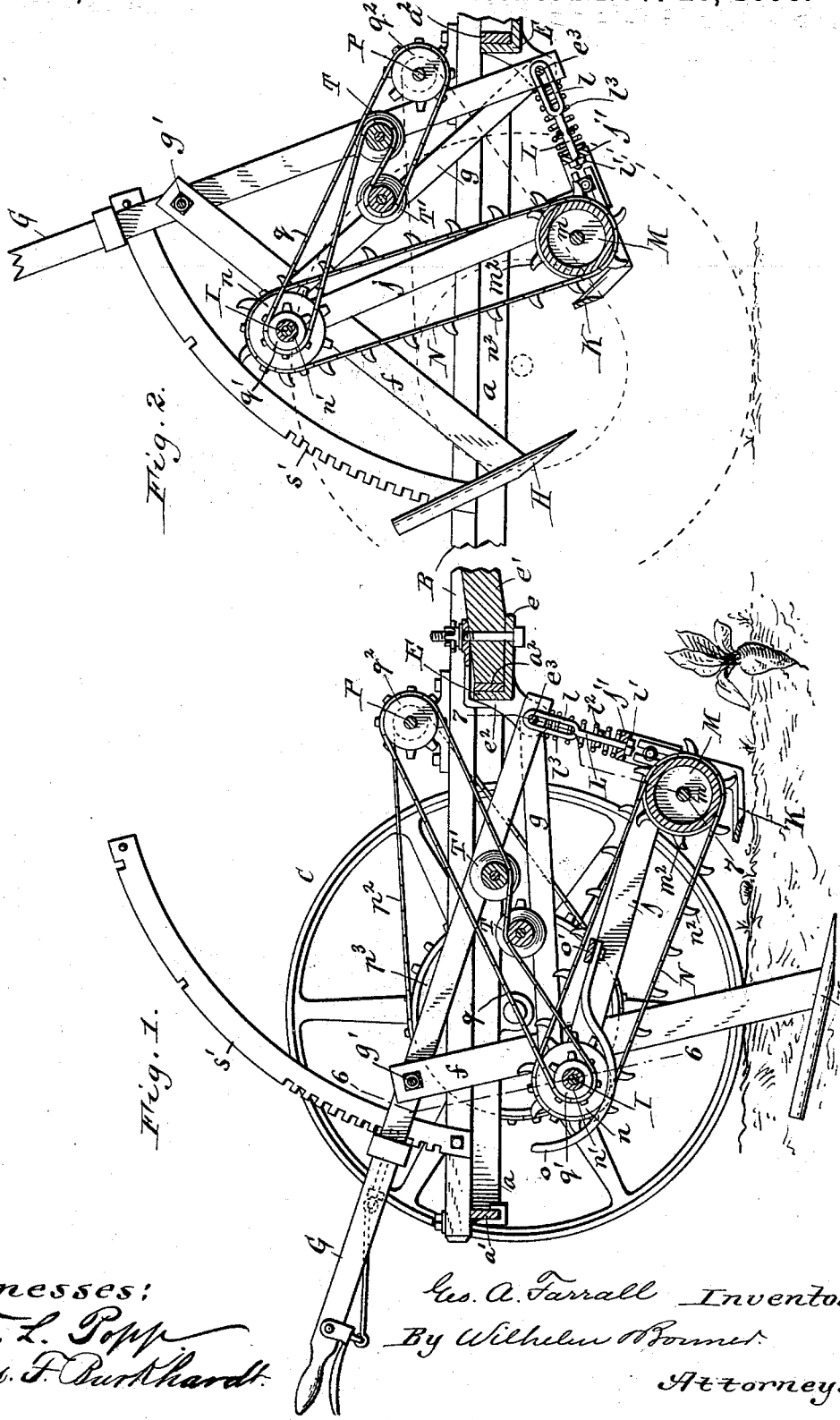

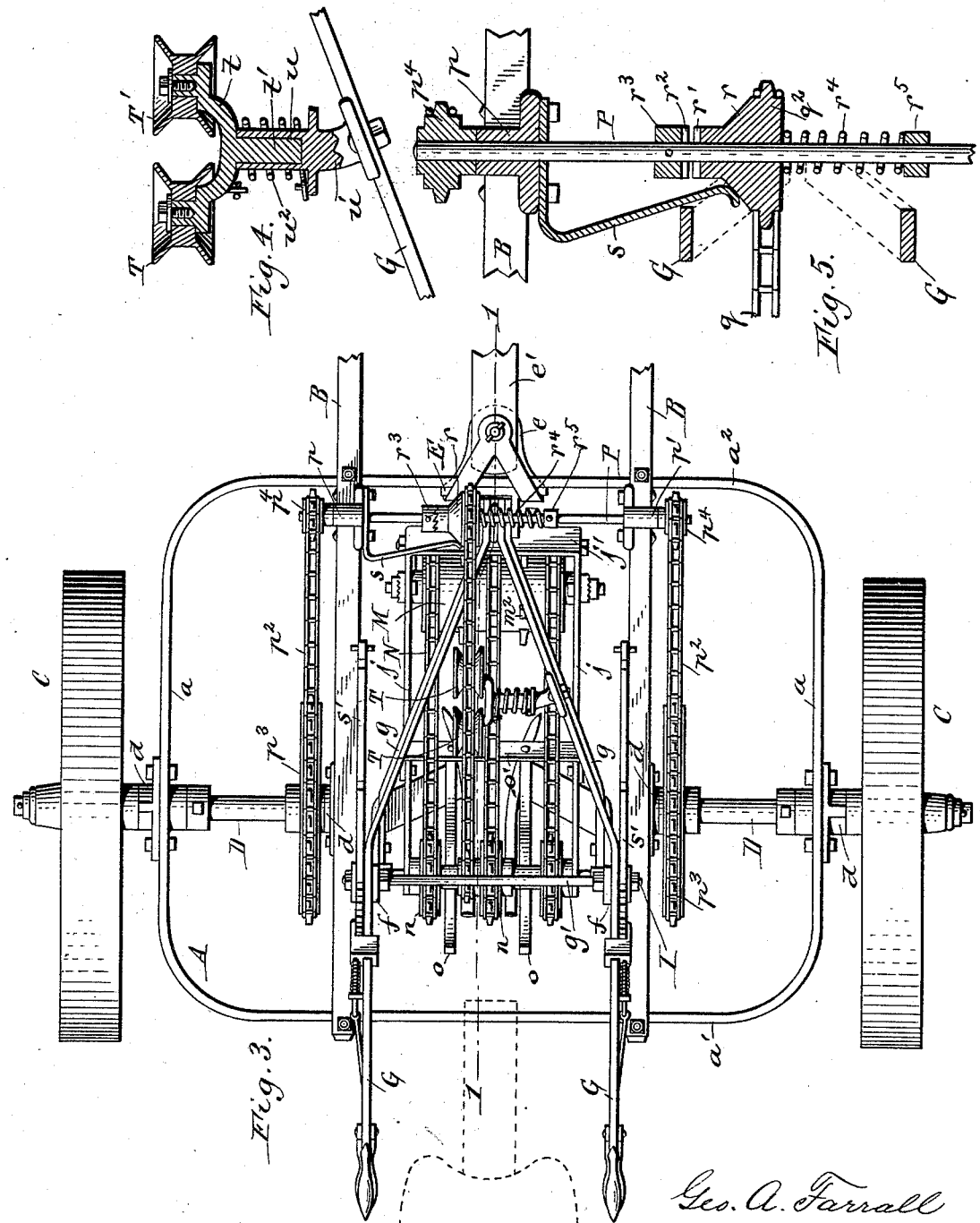

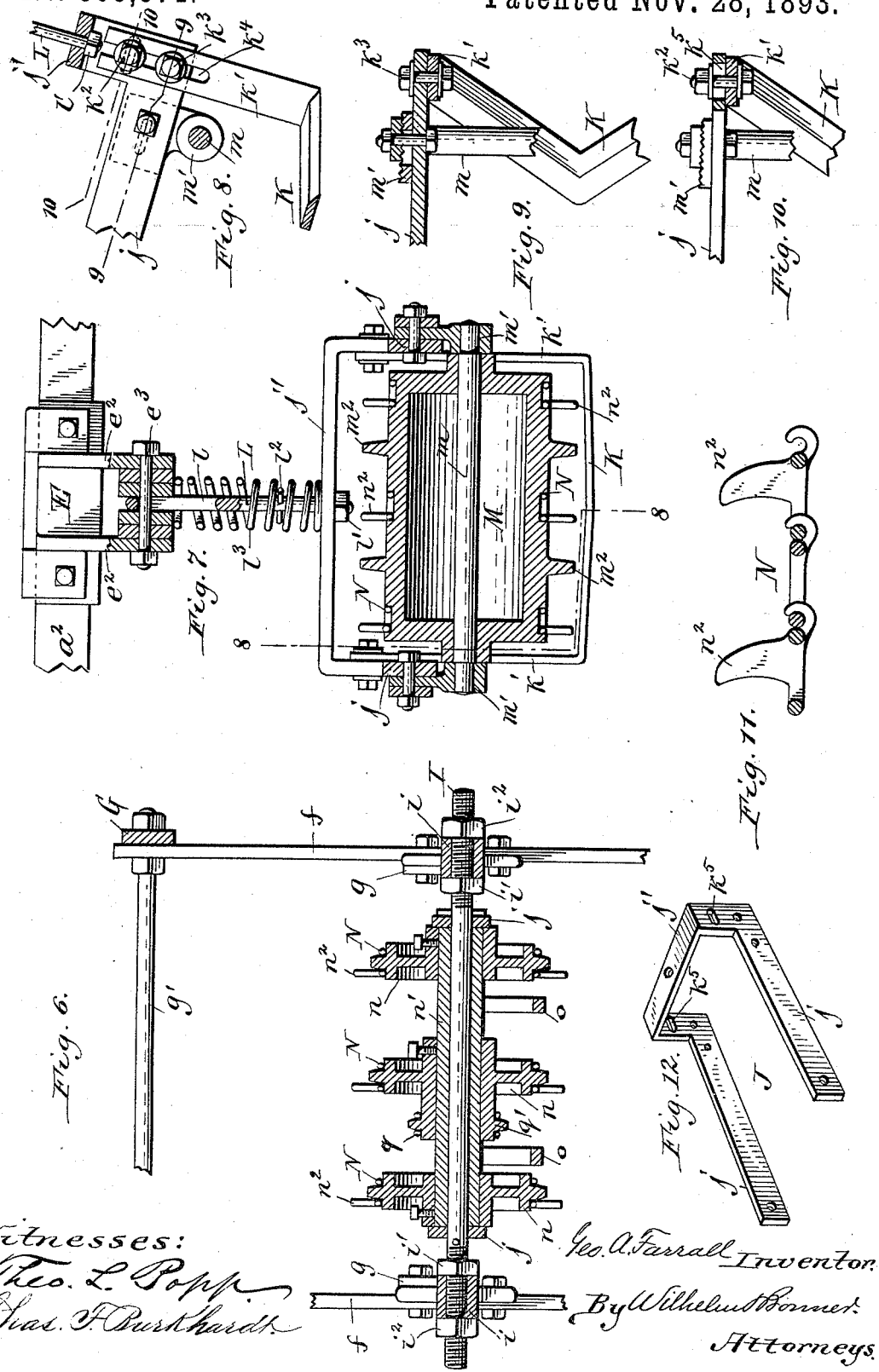

GEORGE A. FARRALL, OF BATAVIA, NEW YORK, ASSIGNOR TO THE JOHNSTON HARVESTER COMPANY, OF SAME PLACE.

BEET-HARVESTER.

SPECIFICATION forming part of Letters Patent No. 509,571, dated November 28, 1893.

Application filed November 14, 1892. Serial No. 451,851. (No model.)

*To all whom it may concern:*

Be it known that I, GEORGE A. FARRALL, a citizen of the United States, residing at Batavia, in the county of Genesee and State of New York, have invented new and useful Improvements in Beet-Harvesters, of which the following is a specification.

This invention relates to a machine for harvesting turnips and beets, and which first cuts the tops off the beets and then digs the beets out of the ground.

In the accompanying drawings consisting of three sheets: Figure 1 is a vertical longitudinal section of my improved machine showing the cutter and digger mechanism lowered to their operative position. Fig. 2 is a similar view showing the cutter and digger mechanism raised for transportation. Fig. 3 is a top plan view of the machine. Fig. 4 is a sectional plan view of the belt tightener on an enlarged scale. Fig. 5 is a sectional plan view, on an enlarged scale, of the clutch and connecting parts by which the clearer belts are driven or stopped. Figs. 6 and 7 are vertical transverse sections, on an enlarged scale, in lines 6—6 and 7—7, Fig. 1. Fig. 8 is a vertical longitudinal section in line 8—8, Fig. 7. Figs. 9 and 10 are fragmentary longitudinal sections in lines 9—9 and 10—10, Fig. 8. Fig. 11 is a fragmentary longitudinal section of one of the clearer belts. Fig. 12 is a perspective view of the cutter frame.

Like letters of reference refer to like parts in the several figures.

A represents the horizontal four-sided frame composed of side bars $a$, a rear cross bar $a'$, and a front cross bar $a^2$.

B represents two longitudinal beams secured to the cross bars inside of the side bars and forming with the four-sided frame the main frame of the machine.

C represents the ground wheels upon which the machine runs and which are arranged on the outer sides of the side bars $a$. The ground wheels are mounted upon transverse axles D, which are journaled in bearings $d$ secured to the side bars and beams of the main frame.

E represents a bracket secured centrally to the under and rear sides of the front cross bar $a^2$ and provided with a forwardly projecting bottom plate $e$ to which the tongue $e'$ is pivoted and two vertical ears $e^2$ projecting rearwardly.

The digger frame is arranged between the beams and carries the beet cutting and digging implements. This frame is pivoted at its front end to a transverse pivot bolt $e^3$ mounted in the ears of the bracket E, and which permits the digger frame to be raised and lowered. The digger frame consists essentially of two like parts, each of which is composed of an upright digger bar $f$, a handle bar G, extending rearwardly from the pivot bolt and secured near its middle to the upper end of the digger bar and a longitudinal brace $g$ extending from the pivot bolt to the digger bars below the upper end thereof. The two parts of the digger frame diverge rearwardly from the front pivot to the upright digger bars and the handle bars extend from that point rearwardly in a longitudinal direction, as represented in Fig. 3.

$g'$ is a cross bar which connects the upper end of the handle and digger bars.

H represents the digger tools or plows which are attached to the lower ends of the digger bars and which enter the ground and dig up the beets.

I represents a transverse adjusting bar whereby the distance between the digger tools can be adjusted. The ends of this bar are screw-threaded and arranged in eyes or sockets $i$ secured to the middle portions of the digger bars.

$i'$, $i^2$ represent clamping nuts arranged upon each threaded end of the adjusting bar and bearing respectively against the inner and outer sides of each eye. By shifting these nuts in or out upon the adjusting bar, the lower ends of the digger bars carrying the digger tools can be readily adjusted toward and from each other, the upper ends being held by the cross bar $g'$, so that a comparatively small adjustment on the adjusting bar produces a considerable lateral adjustment of the tools. By this means the latter can be readily adjusted to suit the condition of the soil and the size of the beets, and can be securely held in their adjusted position.

J represents the cutter frame supporting the cutter mechanism and consisting of two longitudinal bars $j$ pivoted with their rear ends upon the adjusting bar and a cross bar $j'$ connecting the front ends of the longitudinal bars $j$. The front cross bar is preferably elevated above the front ends of the longitudinal bars, as represented in Fig. 12.

K represents a horizontal cutter whereby the tops of the beets are cut off. This cutter is V-shaped, and its two cutting edges diverge from the center of the cutter forwardly. The outer ends of the cutter are provided with upright arms $k'$ which are secured to the front portions of the longitudinal members of the cutter frame on the inner sides thereof, by upper and lower fastening bolts, $k^2$ $k^3$, passing through slots $k^4$ formed in the upright arms of the cutter, as represented in Figs. 8, 9, and 10. By loosening the fastening bolts $k^2$ $k^3$ the cutter can be adjusted vertically. The upper fastening bolt $k^2$ passes through a longitudinal slot $k^5$ in the cutter frame, as represented in Fig. 10, which permits the cutter to be tilted lengthwise of the machine to adjust the position of the cutter blade with reference to the horizon.

L represents a link whereby the front end of the cutter frame is supported. This link is provided in its upper end with an elongated eye $l$ by which it is hung upon the pivot bolt $e^3$ on which the digger frame is hung. The lower end of the link passes loosely through an opening in the front cross bar of the cutter frame and is provided with a screw nut $l'$ which bears against the under side of said bar. The downward movement of the cutter is limited by the upper end of the eye and the nut of the link, but the cutter is capable of a limited upward movement by the link sliding upwardly on the pivot bolt $e^3$ and by the front bar of the cutter frame moving upwardly on the lower part of the link. The downward movement of the link through the cutter frame is limited by a pin $l^2$ secured in the link at a short distance above the front part of the cutter frame and adapted to bear against the upper side of the cross bar of the cutter frame before the link strikes the clearing mechanism arranged above the cutter. The cutter is yieldingly held in a depressed position by a spiral spring $l^3$ surrounding the link L, and bearing with its ends against the cross bar of the cutter frame and the handle bars.

M represents a gage roller which is arranged over the cutter and rolls over the tops of the beets and regulates the depth of the cut. This gage roller is mounted upon a transverse shaft $m$ which is journaled in bearings $m'$ secured to the longitudinal members of the cutter frame. The gage roller is provided on its periphery with teeth $m^2$ which carry the leaves and beet tops backwardly over the cutter, thereby preventing the same from becoming clogged.

N represents clearer belts or chains whereby the movement of the tops and leaves is controlled between the cutter and the digger bars and tools and which prevent the latter from becoming clogged. These belts are arranged lengthwise in the machine and extend from the front portion of the cutter frame rearwardly beyond the digger bars, the lower portion of the belts, which bear upon the tops and leaves, moving rearwardly. Three of these belts are preferably arranged side by side at suitable distances apart. These belts pass with their front portions around the gage roller and with their rear portions around sprocket wheels $n$ which are secured to a sleeve $n'$ journaled upon the adjusting bar I. By this construction the adjusting bar serves as a means for adjusting the digger tools and also forms a convenient journal for the sleeve carrying the sprocket wheels. The speed of the clearer belts is so regulated that the backward movement of the lower or carrying portions of the belts is the same as the forward movement of the machine. This causes the clearer belts to grasp the leaves and tops as they are cut from the beets and hold them practically immovable upon the ground until the diggers have passed underneath them, thereby preventing the leaves and beet tops from spreading and clogging the digger arms and also preventing the leaves and tops being dragged along, thus reducing the resistance which must be overcome in drawing the machine. The clearer belts or chains are preferably provided with teeth $n^2$ in order to give the belts a firm hold on the leaves and tops.

$o$ represents clearer arms whereby any leaves, &c., which may cling to the delivery portions of the belts are removed therefrom. These clearer arms are arranged between the belts and are secured with their front ends to an intermediate cross bar $o'$ connecting the longitudinal members of the cutter frame and extend rearwardly beyond the clearer belts.

P represents a transverse counter shaft journaled in bearings $p$ $p'$ on the front portion of the beams and driven by chain belts $p^2$ running around sprocket wheels $p^3$ $p^4$ secured respectively to the axles of the ground wheels and the ends of the counter shaft.

Motion is transmitted from the counter shaft to the clearer belts by a chain belt $q$ which runs around a small sprocket wheel $q'$ formed integrally with one of the sprocket wheels $n$ and a clutch sprocket wheel $q^2$ mounted on the counter shaft P. The sprocket wheel $q^2$ is provided on one side with a cone $r$ and a toothed clutch face $r'$ which latter is adapted to engage with a similar clutch face $r^2$ formed on a collar $r^3$ secured to the counter shaft, as represented in Figs. 3 and 5. The sprocket wheel $q^2$ is capable of lengthwise movement on the counter shaft, which permits the same to be connected and disconnected from the clutch collar on the counter shaft. When the machine is in operation the clutch face of the sprocket wheel is held in engagement with the clutch face of the collar by a spring $r^4$ surrounding the counter shaft and bearing with its ends against said sprocket wheel and a collar $r^5$ secured to the counter shaft.

$s$, Figs. 3 and 5, is a spring arm secured with one end to the bearing $p$ of the counter shaft or some other stationary part and bearing with its free end against the cone of the sprocket wheel $q^2$. Upon raising the digger frame to its highest position, when it is desired to transport the machine, one of the handle bars strikes the spring arm and causes the latter to press against the cone and move the clutch sprocket wheel out of engagement with the clutch collar, as represented in Figs. 2 and 5, thereby automatically throwing the clearer belts out of gear with the driving mechanism. By supporting the cutter mechanism and the clearer belts upon the digger frame all of these instrumentalities are raised and lowered simultaneously.

$s'$ represents notched segments secured to the main frame and upon which the handle bars are locked at any desired elevation.

Upon raising the digger frame the chain belt $q$ becomes slack owing to the eccentric location of the clutch sprocket wheel with reference to the pivot of the digger frame. In order to prevent this slackening of the belt, a belt tightener is provided which is constructed as follows: $T$, $T'$, Figs. 1, 2, 3, and 4, represent tightener pulleys which are arranged one behind the other and bear against opposite sides of the lower slack portion of the belt $q$. The tightener pulleys are pivoted upon the ends of a yoke $t$ and the latter is provided midway between the pulleys with a stem $t'$ arranged parallel with the axis of the pulleys. This stem is journaled in a socket $u$ formed in a bracket $u'$ which latter is secured to one of the handle bars of the digger frame. $u^2$ represents a spiral spring surrounding the bracket and having its end secured to the bracket and the yoke. This spring is under tension and causes the yoke to swing on the stem as a center and to press the pulleys constantly against opposite sides of the belt $q$, thereby automatically taking up any slack in the same.

I claim as my invention—

1. The combination with the main frame, of a cutter adapted to sever the tops, and an endless clearer belt arranged with its front portion over the cutter and traveling with its lower portion from the cutter rearwardly, thereby grasping and holding down the tops and leaves upon the ground, substantially as set forth.

2. The combination with the main frame, of a cutter adapted to sever the tops, a digger arranged in rear of the cutter, and a clearer belt arranged above the cutter, and traveling with its lower portion from the cutter toward the digger, substantially as set forth.

3. The combination with the main frame, of a digger frame, a cutter frame and diggers carried thereby pivoted at its rear end to the digger frame and capable of vertical movement at its front end, and a cutter secured to the front portion of the cutter frame, substantially as set forth.

4. The combination with the main frame, of a digger frame capable of vertical movement in the main frame, and diggers carried thereby and a cutter and cutter frame attached to the digger frame, whereby the digger and cutter frames are raised and lowered simultaneously, substantially as set forth.

5. The combination with the main frame, of a digger frame capable of vertical movement in the main frame, and diggers carried thereby a cutter and cutter frame attached to the digger frame, and a clearer belt and supporting pulleys mounted on the cutter frame, substantially as set forth.

6. The combination with the main frame and the digger frame, of a cutter frame pivoted at its rear end to the digger frame and capable of vertical movement at its front end, a cutter secured to the front portion of the cutter frame, a supporting roller arranged over the cutter, a sprocket wheel mounted on the rear pivot of the cutter frame, and a clearer belt passing around said roller and wheel, substantially as set forth.

7. The combination with the main frame and the cutter frame pivoted at its rear end so as to swing vertically at its front end and inclining from its rear end downwardly toward its front end, of a cutter arranged upon the front end of the cutter frame, a link loosely connecting the front end of the cutter frame with the main frame and a spring surrounding the link and pressing down upon the cutter frame substantially as set forth.

8. The combination with the vertically movable cutter frame, and the cutter attached thereto, of a gage roller journaled in the cutter frame above the cutter and provided with projecting teeth, substantially as set forth.

9. The combination with the digger frame provided with diggers, and the cutter frame provided at its front end with a cutter, of a gage roller arranged above the cutter and journaled in the cutter frame, sprocket wheels arranged at the rear end of the cutter frame, and clearer belts running around the gage roller and sprocket wheels, substantially as set forth.

10. The combination with the cutter frame provided with two longitudinal slots, of a cutter arranged underneath the cutter frame and provided at its ends with upright arms having upright slots, each of said arms being secured to the cutter frame by two bolts passing through said slot, and one of the bolts passing through the adjacent longitudinal slot in the cutter frame, whereby the cutter can be adjusted vertically and can also be tilted on the cutter frame, substantially as set forth.

11. The combination with the main frame, the digger frame, and the cutter frame, of a horizontal cutter secured to the front portion of the cutter frame and having its front cutting edge composed of two edges converging rearwardly from the ends of the cutter to the middle thereof, substantially as set forth.

12. The combination with the longitudinal handle bars of the digger frame, of digger bars secured with their upper ends to the handle bars, a cross bar connecting the upper ends of the digger bars, and a transverse adjusting bar connecting the digger bars below said cross bar, substantially as set forth.

13. The combination with the digger frame provided with digger bars having transverse eyes or sockets, of a transverse adjusting bar having screw-threaded ends arranged in said sockets, and clamping nuts arranged upon the adjusting bar on opposite sides of each socket, substantially as set forth.

14. The combination with the digger frame and the cutter frame, of a transverse rod arranged in the digger frame, a sleeve journaled upon said rod, sprocket wheels secured to said sleeve, a gage roller journaled in the cutter frame, and clearer belts running around the sprocket wheels and gage roller, substantially as set forth.

15. The combination with the cutter frame and the cutter arranged at the front end thereof, of clearer belts extending rearwardly from the cutter, and clearer arms arranged between the rear portions of the clearer belts, substantially as set forth.

16. The combination with the cutter frame and the cutter arranged at the front end thereof, of a gage roller arranged over the cutter, sprocket wheels arranged at the rear end of the cutter frame, clearer belts running around said gage roller and sprocket wheels, and clearer arms secured with their front ends to the cutter frame, and projecting with their rear ends beyond the clearer belts, substantially as set forth.

17. The combination with the main frame and the digger frame pivoted thereto, of a clearer belt mounted in the digger frame, a counter shaft journaled upon the main frame and provided with a clutch collar, a clutch wheel capable of longitudinal movement upon the shaft and provided on one side with a cone, a spring arm secured to the main frame, and adapted to be pressed against the cone by the digger frame, and a belt drive connecting the clutch sprocket wheel with the clearer belt, substantially as set forth.

18. The combination with the main frame and the digger frame pivoted thereto, of a clearer belt mounted on the digger frame, a counter shaft mounted on the main frame, a driving belt extending from the counter shaft to the driving shaft of the clearer belt, a yoke provided with rigid arms, pivoted to the digger frame and carrying on said arms pulleys which bear respectively against the inner and the outer sides of the belt, and a spring whereby the yoke is turned on its pivot and the pulleys are pressed against opposite sides of the same portion of the belt, substantially as set forth.

Witness my hand this 11th day of November, 1892.

GEORGE A. FARRALL.

Witnesses:
CARL F. GEYER,
THEO. L. POPP.